(12) United States Patent
Nachenberg

(10) Patent No.: US 8,671,449 B1
(45) Date of Patent: Mar. 11, 2014

(54) SYSTEMS AND METHODS FOR IDENTIFYING POTENTIAL MALWARE

(75) Inventor: Carey S. Nachenberg, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 592 days.

(21) Appl. No.: 12/943,923

(22) Filed: Nov. 10, 2010

(51) Int. Cl.
*G06F 11/00* (2006.01)
*G06F 12/14* (2006.01)
*G06F 13/00* (2006.01)
*G06F 17/30* (2006.01)
*G11C 7/00* (2006.01)
*G08C 23/00* (2006.01)

(52) U.S. Cl.
USPC ............... 726/24; 726/21; 726/22; 726/23; 726/25; 713/187; 713/188

(58) Field of Classification Search
USPC ...................................... 726/22–25
See application file for complete search history.

(56) References Cited

U.S. PATENT DOCUMENTS

| 7,269,851 | B2 | 9/2007 | Ackroyd | |
|---|---|---|---|---|
| 7,472,420 | B1 * | 12/2008 | Pavlyushchik | 726/24 |
| 7,748,038 | B2 * | 6/2010 | Olivier et al. | 726/24 |
| 7,831,412 | B1 | 11/2010 | Sobel | |
| 2005/0283831 | A1 | 12/2005 | Ryu et al. | |
| 2006/0253584 | A1 | 11/2006 | Dixon et al. | |
| 2008/0005223 | A1 * | 1/2008 | Flake et al. | 709/203 |
| 2008/0072049 | A1 * | 3/2008 | Cross et al. | 713/176 |
| 2009/0044024 | A1 * | 2/2009 | Oberheide et al. | 713/188 |

OTHER PUBLICATIONS

Sourabh Satish et al.; Social Trust Based Security Model; Mar. 31, 2006; U.S. Appl. No. 11/394,846.
Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.

* cited by examiner

*Primary Examiner* — Saleh Najjar
*Assistant Examiner* — Feliciano Mejia
(74) *Attorney, Agent, or Firm* — ALG Intellectual Property, LLC

(57) ABSTRACT

A computer-implemented method for identifying potential malware may include (1) identifying a file that is subject to a reputation evaluation, (2) identifying at least one client submission received from at least one computing system that identifies (a) an instance of the file created on the computing system and (b) at least one additional file created on the computing system at substantially the same time as the instance of the file and within the same file path as the instance of the file, (3) identifying a reputation associated with the additional file(s), and then (4) generating a reputation rating for the file based at least in part on the reputation associated with the additional file(s). Various other methods, systems, and computer-readable media are also disclosed.

20 Claims, 7 Drawing Sheets

SYSTEMS AND METHODS FOR IDENTIFYING POTENTIAL MALWARE

BACKGROUND

In recent years, authors of malicious software ("malware") have attempted to proliferate malware by generating thousands or potentially millions of variations of a malicious program or file. For example, a malware author may create a unique variant of a malicious file for each intended target by repacking, compressing, encrypting, and/or otherwise obfuscating the file before distributing (or redistributing) the same. Unfortunately, because many existing antivirus technologies detect malware by detecting or identifying unique digital signatures or fingerprints associated with known-malicious files, malware authors may avoid detection by such technologies by only distributing new (i.e., unique) variants of their malicious files.

In an attempt to combat this problem, at least one security-software vendor has attempted to implement a reputation-based security system. In a reputation-based security system, a security-software vendor may attempt to determine the trustworthiness of a file by collecting, aggregating, and analyzing data from potentially millions of user devices within a community, such as the security-software vendor's user base. For example, by determining a file's origin, age, and prevalence within the community (such as whether the file is predominantly found on at-risk or "unhealthy" machines within the vendor's user base), among other details, a security-software vendor may gain a fairly accurate understanding as to the trustworthiness of the file.

Current reputation-based security systems often face tradeoffs between the number of false negatives (i.e., how many malicious files are missed) and the number of false positives (i.e., how many benign files are misidentified as malicious). As such, the instant disclosure identifies a need for additional and improved systems and methods for identifying potential malware using reputation information.

SUMMARY

As will be described in greater detail below, the instant disclosure generally relates to systems and methods for identifying potential malware by imputing the reputations of known files to unknown files that were created within the same file paths (and during substantially the same time period) as instances of the known files. In one example, a server-side computing device may accomplish such a task by (1) identifying a file that is subject to a reputation evaluation, (2) identifying at least one client submission received from at least one computing system that identifies at least one additional file that was created at the same time as, and within the same file path as, an instance of the file in question, (3) identifying the reputation of the additional file(s), and then (4) generating a reputation rating for the file based at least in part on the reputations of the additional file(s).

In some examples, each identified client submission may include identification information that uniquely identifies (by, e.g., file name, file hash, and/or file path) files created on the computing system in question within a certain time period (e.g., the last 24 hours) and/or since the computing system's previous client submission. In one example, the systems described herein may identify a client submission upon receiving the same from a computing system. In other examples, the systems described herein may identify a client submission by querying a submission database for the same.

The systems described herein may generate the reputation rating for the file using a variety of formulas. In some examples, if the client submission identified a plurality of additional files created within the same file path (and during the same time period) as an instance of the file, the systems described herein may generate the reputation rating for the file based on an aggregation of the reputations associated with the plurality of additional files. In one example, this aggregation of reputations may be based in part on the number of trusted files within the plurality of additional files and/or the number of untrusted files within the plurality of additional files. Additionally or alternatively, this aggregation of reputations may be based in part on the percentage of trusted and/or the percentage of untrusted files within the plurality of additional files. This aggregation of reputations may also be based in part on the percentage of trusted and/or the percentage of untrusted files within each client submission.

In some examples, the file path may refer to the same directory, folder, or other hierarchical unit of a file system. Additionally or alternatively, this file path may include a truncated file path (thereby identifying files as within the same file path if, e.g., they share the same truncated file path).

In one example, the systems described herein may provide the reputation rating assigned to the file in question to at least one additional computing system, such as a client device, in order to enable the client device to evaluate the trustworthiness of the file in question. In this example, a client device may evaluate the trustworthiness of a file by (1) identifying a file that is subject to a reputation evaluation, (2) requesting a reputation rating for the file from a reputation server, and (3) receiving the reputation rating for the file from the reputation server, and then (4) evaluating the trustworthiness of the file based at least in part on the reputation rating assigned to the file.

As detailed above, this reputation rating may be derived at least in part from a reputation associated with at least one additional file created on at least one additional computing system (1) at the same time as an instance of the file and (2) within the same file path as the instance of the file. In some examples, the systems described herein may also perform a security action on the file based at least in part on the reputation rating.

As will be described in greater detail below, by imputing the reputation information of one or more files created at substantially the same time and within the same file path as instances of a file to evaluate, the systems and methods described herein may improve the quality of reputation assessments, thereby improving malware detection rates relative to false positives.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
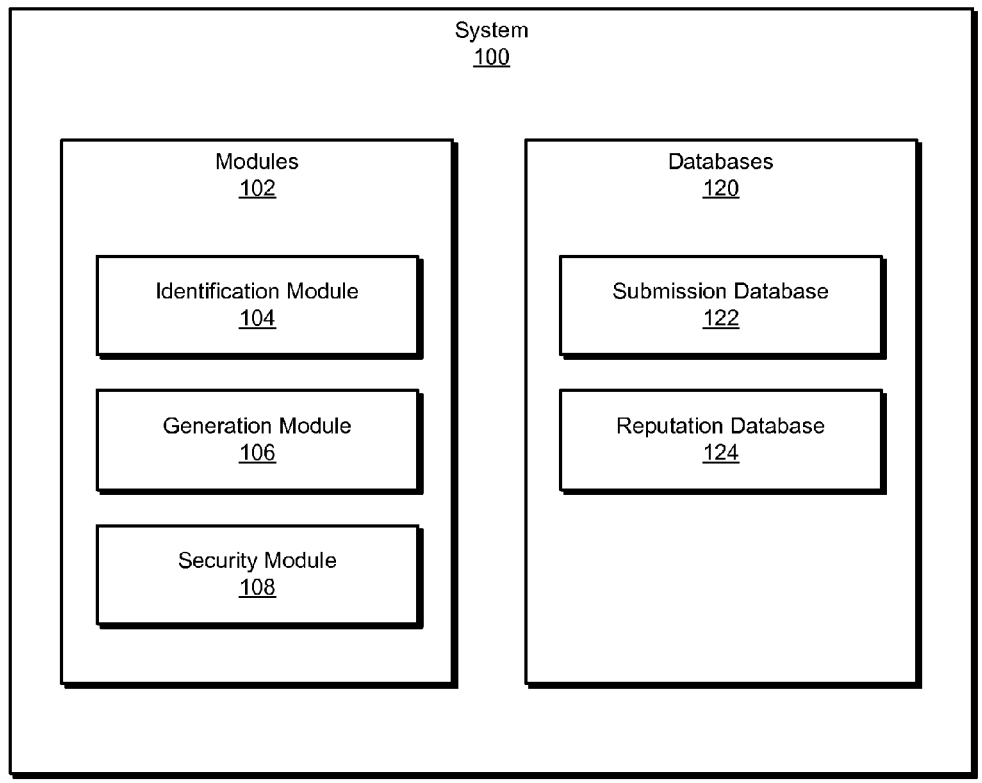
FIG. 1 is a block diagram of an exemplary system for identifying potential malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
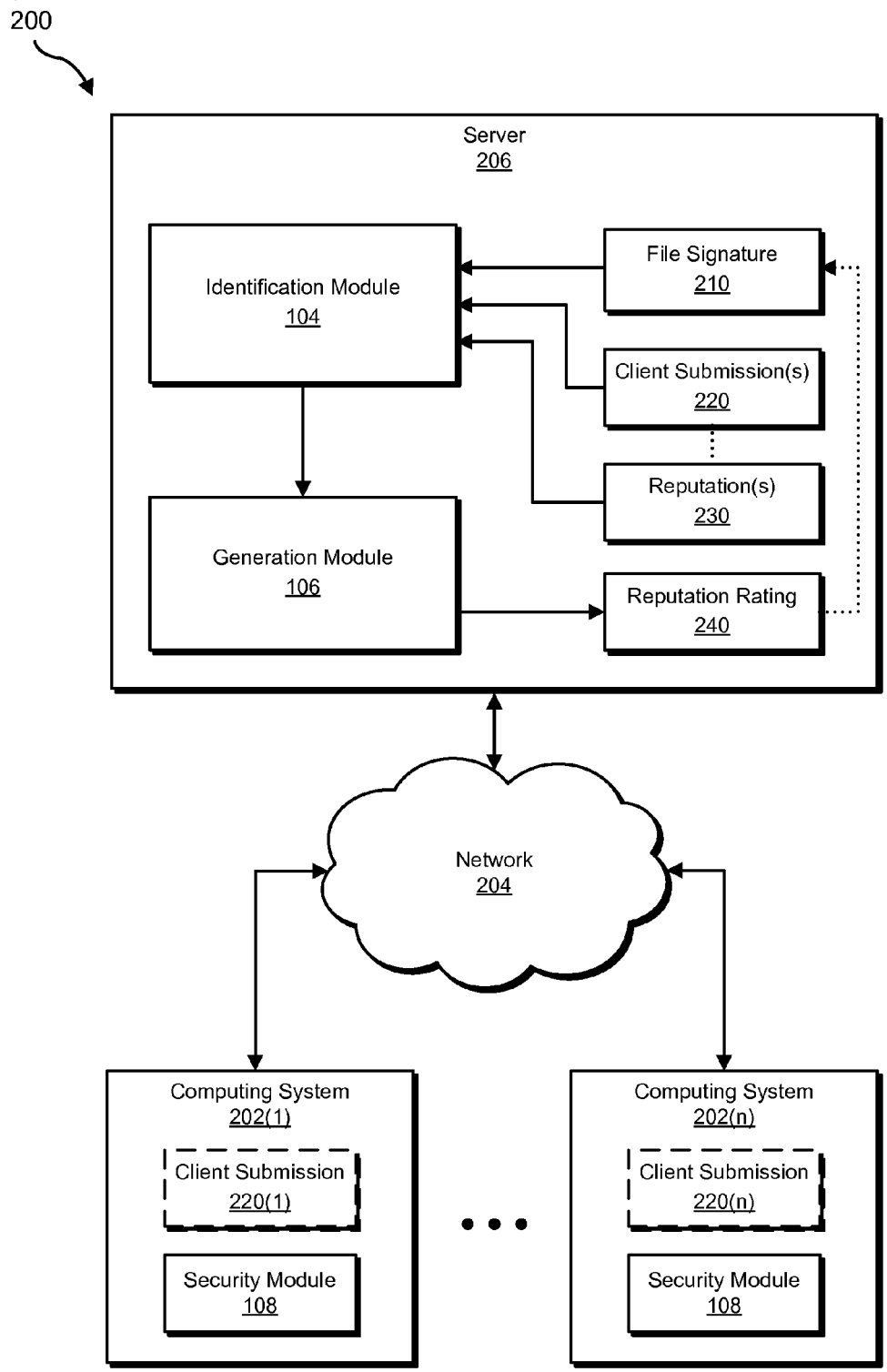
FIG. 2 is a block diagram of an exemplary system for identifying potential malware.
Figure 3:
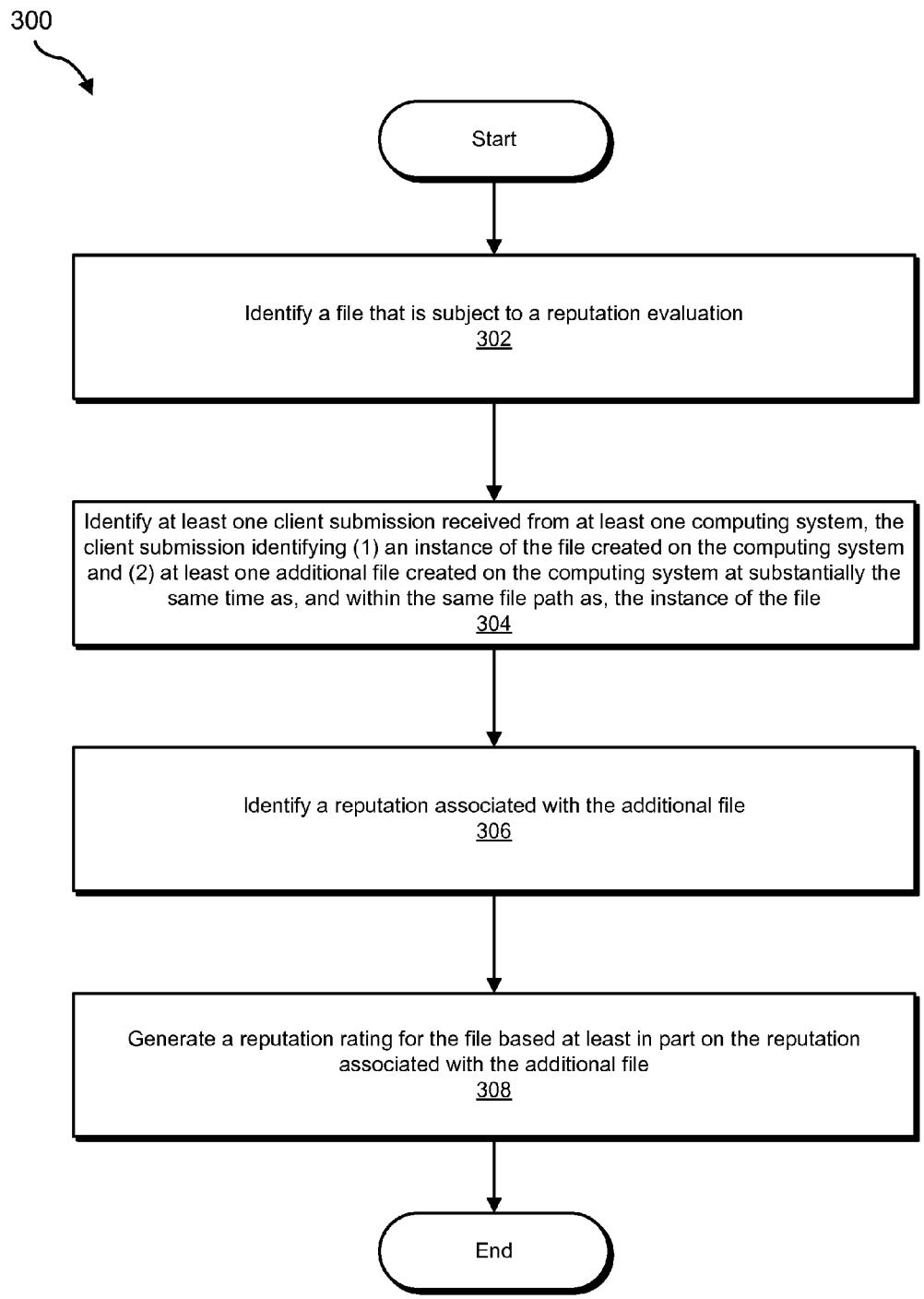
FIG. 3 is a flow diagram of an exemplary method for identifying potential malware.
Figure 4:
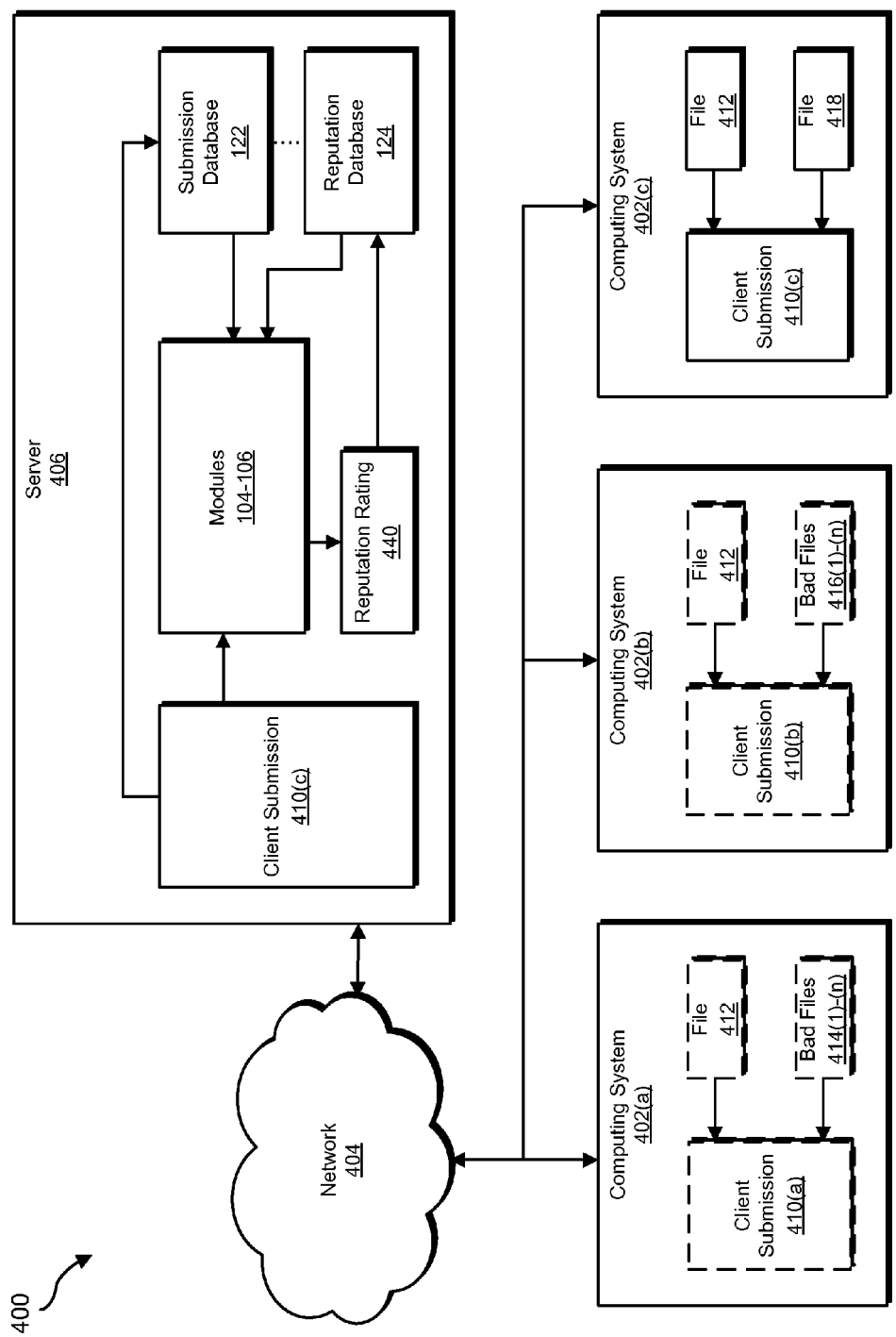
FIG. 4 is a block diagram of an exemplary system for identifying potential malware.

The following will provide, with reference to FIGS. 1, 2, and 4, detailed descriptions of exemplary systems for identifying potential malware. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for identifying potential malware. As illustrated in this figure, exemplary system 100 may include one or more modules 102 for performing one or more tasks. For example, and as will be explained in greater detail below, exemplary system 100 may include an identification module 104 programmed to identify a file that is subject to a reputation evaluation. Identification module 104 may also be programmed to identify at least one client submission received from at least one computing system within a user community (such as the user base of a security-software publisher) that identifies, for each computing system in question, (a) an instance of the file created on the computing system and (b) at least one additional file created on the computing system at substantially the same time as the instance of the file and within the same file path as the instance of the file. The identification module may additionally be programmed to identify a reputation associated with each additional file.

In addition, and as will be described in greater detail below, exemplary system 100 may include a generation module 106 programmed to generate a reputation rating for the file based at least in part on the reputation associated with each additional file. Exemplary system 100 may also include a security module 108 programmed to evaluate the trustworthiness of a file based at least in part on a reputation rating assigned to the file by generation module 106. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing systems 202(1)-(n) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120, such as submission database 122 and reputation database 124. In one example, and as will be explained in greater detail below, submission database 122 may house client-submission data received from client devices within a user community (such as an enterprise or user base). In addition, reputation database 124 may contain information that identifies the reputation or prevalence of one or more files within the user community.

Databases 120 may represent portions of a single database or computing device or a plurality of databases or computing devices. For example, databases 120 may represent a portion of server 206 in FIG. 2, computing system 610 in FIG. 6, and/or portions of exemplary network architecture 700 in FIG. 7. Alternatively, databases 120 in FIG. 1 may represent one or more physically separate devices (such as, e.g., a database maintained by a reputation service) capable of being accessed by a computing device, such as server 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of computing systems 202(1)-(n) in communication with a server 206 via a network 204.

In one embodiment, and as will be described in greater detail below, one or more of modules 102 from FIG. 1 may program server 206 and/or computing systems 202(1)-(n) to perform various server-side and/or client-side services. For example, modules 102 may program server 206 to assign reputation ratings to files by (1) identifying a file that is subject to a reputation evaluation, (2) identifying at least one client submission (e.g., client submission(s) 220) received from at least one computing system (e.g., one or more of computing systems 202(1)-202(n)) that identifies (a) an instance of the file created on the computing system and (b) at least one additional file created on the computing system at the same time as the instance of the file and within the same file path as the instance of the file, (3) identifying a reputation associated with each additional file (e.g., reputation(s) 230), and then (4) generating a reputation rating (e.g., reputation rating 240) for the file based at least in part on the reputation of each additional file.

Similarly, in some examples one or more of modules 102 may program computing system 202(1) to evaluate the trustworthiness of a file by (1) identifying a file that is subject to a reputation evaluation (by, e.g., detecting a file downloaded or otherwise encountered by computing system 202(1)), (2) requesting a reputation rating for the file from a reputation server (e.g., server 206), (3) receiving a reputation rating for the file from the reputation server, and then (4) evaluating the trustworthiness of the file based at least in part on the reputation rating assigned to the file. In this example, the reputation rating may be derived at least in part from the reputation of at least one additional file created on at least one additional computing system at the same time as an instance of the file and within the same file path as the instance of the file.

Computing systems 202(1)-(n) generally represent any type or form of computing device capable of reading computer-executable instructions. Examples of computing systems 202(1)-(n) include, without limitation, laptops, desktops, servers, cellular phones, personal digital assistants (PDAs), multimedia players, embedded systems, combinations of one or more of the same, exemplary computing system 610 in FIG. 6, or any other suitable computing device. In one example, computing systems 202(1)-(n) may represent client devices within a user community, such as an enterprise or the user base of a security-software vendor.

Server 206 generally represents any type or form of computing subsystem (such as a reputation service) capable of generating and providing information that identifies a file's reputation or prevalence. As will be explained in greater detail below, in some examples server 206 may generate such information by collecting, aggregating, and analyzing data from potentially millions of user devices within a community.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing systems 202(1)-(n) and server 206.

FIG. 3 is a flow diagram of an exemplary server-side, computer-implemented method 300 for identifying potential malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or system 400 in FIG. 4.

As illustrated in FIG. 3, at step 302 one or more of the systems described herein may identify a file that is subject to a reputation evaluation. For example, at step 302 identification module 104 may, as part of server 206 in FIG. 2, identify a file whose reputation is to be evaluated.

Identification module 104 may perform step 302 in a variety of contexts. In one example, identification module 104 may identify the file upon receiving a request from a client system (such as computing system 202(1) in FIG. 2) to evaluate the trustworthiness of the file. Additionally or alternatively, identification module 104 may identify the file upon receiving a report and/or submission from a client system that identifies the file in question. As will be described in greater detail below, the systems described herein may receive reports of newly created files from many client systems, and the systems described herein may identify files within these reports as files subject to reputation evaluations and/or use these reports to conduct reputation evaluations.

For example, in the embodiment illustrated in FIG. 4, server 406 may receive a client submission 410(c) from a computing system 402(c) (which may, as with computing systems 202(1)-(n) in FIG. 2, represent a client device within a user community). In this example, client submission 410(c) may uniquely identify (by, e.g., file name, file hash, and/or file path, as explained in greater detail below) two files recently created or encountered by computing system 402(c): file 412 and file 418. Upon receiving and parsing client submission 410(c), identification module 104 on server 406 may then determine, by querying reputation database 430 (using, e.g., a SHA2 hash of file 412), that the reputation of file 412 is unknown and, accordingly, that the reputation of file 412 should be assessed or evaluated.

The term "reputation," as used herein, generally refers to information that conveys the opinion of a specific community (such as the user base of a security-software publisher) on the trustworthiness or legitimacy of a file (e.g., a standalone executable file, a library file, an object file, a script, a plug-in, etc.). Information relating to the reputation of a file may include reputation scores (where, for example, high reputation scores indicate that a file is generally trusted within a community and low reputation scores indicate that a file is generally untrusted within a community), prevalence information (e.g., information that identifies the number or percentage of user devices within a community that have encountered an instance of the file), or any other information that may be used to identify a community's opinion on the trustworthiness or legitimacy of a file, such as the file's location or origin, age, etc.

As indicated above, reputation services may generate reputation ratings for files by collecting, aggregating, and analyzing data from user devices within a community. Examples of data gathered from user devices within a community that may be used to generate reputation ratings include, without limitation, information that identifies the overall health of a user device (i.e., information that identifies the performance, stability, and/or state of security of the user device), information that identifies the files stored on or encountered by a user device, information that identifies the impact of a file on the health of the user device (e.g., information that identifies the health of a user device both before and after a file is encountered by the user device), and any other information that may be used to evaluate the trustworthiness of a file. In some examples, by collecting, aggregating, and analyzing this data from potentially millions of user devices within a community (such as the user base of a security-software vendor), reputation services may be able to gain a fairly accurate understanding as to the trustworthiness of a file.

Returning to FIG. 3, at step 304 one or more of the systems described herein may identify at least one client submission received from at least one computing system that identifies at least one additional file created at the same time as, and within the same file path as, an instance of the file in question. For example, at step 304 identification module 104 may, as part of server 206 in FIG. 2, receive a client submission 220 from computing system 202(1) that identifies a plurality of additional files created at the same time as, and within the same file path as, an instance of the file in question.

As used herein, the phrase "at the same time" may refer to a variety of measures. For example, two files may be considered to have been created at the same time if the two files were both created within a predetermined time window (e.g., 24 hours). Additionally or alternatively, two files may be considered to have been created at the same time if they were both created after a certain event (e.g., after the most recent client submission from the computing system). In some examples, two files may be considered to have been created at the same time if the two files are clustered during a statistical analysis of the creation times of a larger group of files.

In addition, the phrase "client submission" may refer to any submission and/or report relating to a client (such as the computing system in step 304) that is made available to the systems described herein (by, e.g., transmitting the client submission to a server configured with one or more of the modules described herein). In some examples, this client submission may include a report for each new file created on or encountered by the computing system since a previous client submission and/or within a certain time period (e.g., the last 24 hours). For example, a computing system may cache information about newly created files and regularly submit this cached information at timed intervals. Each individual file report within the client submission may include a variety of information about the newly created file, such as the name of the newly created file, the file path of the newly created file, and/or a file hash of the newly created file.

In some examples, the computing system may transmit the entire client submission at once. In other examples, the computing system may transmit the client submission in multiple parts (with, e.g., each part identifying a single file). In these examples, the computing system may transmit each part of the client submission as the information becomes available (e.g., each time a new file is created, another part of the client submission may be transmitted).

As used herein, the phrase "within the same file path" may refer to the same directory, folder, or other hierarchical unit of a file system. Additionally or alternatively, two files may be within the same file path if they are each within the directory specified by the file path or a subdirectory within the directory. For example, the file paths C:\foo\bar\, C:\foo\bar\file1, and C:\foo\bar\sub1\sub2\file2 may represent locations within the same file path (e.g., C:\foo\bar\).

In some examples, the file path may include a truncated file path. For example, if a file is created in C:\foo\bar\sub1\sub2\, the file path associated with the file may be truncated to a two-directory-deep path: C:\foo\ bar\. In other examples, the file path may be truncated to an n-directory-deep path, where n is a number which results in the most effective reputation evaluations. In these examples, identification module 104 may identify two files as within the same file path if the two files are within the same truncated file path (e.g., if each file is within the last directory of the truncated path or any subdirectory). In some examples, this identification process may account for and/or exclude symbolic links (e.g., a lateral link to a directory that thereby circumvents the file system hierarchy).

The systems described herein may identify the client submission(s) in step 304 in a variety of ways. In one example, the systems described herein may identify a client submission upon receiving the same from a computing system. For example, identification module 104 may, as part of server 406 in FIG. 4, identify client submission 410(a) upon receiving the same from computing system 402(a). In this example, client submission 410(a) may indicate that instances of file 412 and files 414(1)-(n) were recently generated within the same file path on computing system 402(a).

In other examples, the systems described herein may identify a client submission by querying a submission database for the same. For example, identification module 104 may, by querying submission database 420 using an SHA2 hash of file 412, identify a prior client submission received from computing system 402(b) that indicates that instances of file 412 and files 416(1)-(n) were recently generated within the same file path on computing system 402(b).

Returning to FIG. 3, at step 306 one or more of the systems described herein may identify the reputation of each additional file identified in step 304. For example, identification module 104 may, as part of server 206 in FIG. 2, identify a reputation 230 associated with the additional file(s) identified in the client submission(s) identified in step 304.

The systems described herein may perform step 306 in any suitable manner. In one example, identification module 104 may query (using, e.g., file hashes) a reputation service or database for the reputation of each additional file identified in step 304. As detailed above, the reputation of each additional file may be represented as a reputation score, a reputation classification (e.g., "trusted," "untrusted," or "unknown"), and/or any other suitable metric.

Using FIG. 4 as an example, identification module 104 may query reputation database 130 for the reputation of each additional file identified in step 304. For example, continuing the embodiment detailed above, identification module 104 may query reputation database 130 for the reputations of files 414(1)-(n) and files 416(1)-(n). In this example, identification module 104 may determine, based on the reputations obtained from reputation database 130, that files 414(1)-(n) and 416(1)-(n) represent "bad" or "malicious" files.

Returning to FIG. 3, at step 308 one or more of the systems described herein may generate a reputation rating for the file in question based at least in part on the reputation of the additional file(s) identified in step 306. For example, at step 308 generation module 106 may, as part of server 406 in FIG. 4, generate a reputation rating 440 for file 412 based at least in part on the reputations of files 414(1)-(n) and 416(1)-(n) (obtained, e.g., from reputation database 124).

Generation module 106 may perform step 308 in a variety of ways. In one example, generation module 106 may generate the reputation rating for the file by generating a composite reputation rating based on the reputation(s) identified in step 306. Accordingly, if the reputation of each additional file identified in step 304 is poor, generation module 106 may lower an existing reputation rating associated with the file or, if the reputation of the file in question is unknown, assign a relatively low reputation rating to the file. Conversely, if the reputation associated with each additional file is good, generation module 106 may raise an existing reputation rating associated with the file or, if the reputation of the file in question is unknown, assign a relatively high reputation rating to the file. In some examples, generation module 106 may also assign and/or adjust the reputation rating of the file in question based on other factors, such as the source of the file, the prevalence of the file, or the like.

In some examples, identification module 104 may have identified a plurality of additional files in step 304 that were created at the same time as and within the same file paths as instances of the file in question. In these examples, generation module 106 may generate the reputation rating for the file in step 308 based at least in part on an aggregation of the reputations associated with these additional files.

Generation module 106 may aggregate the reputations associated with these additional files in a variety of ways. In one example, this aggregation may include the number of trusted files within the additional files and/or the number of untrusted files within the additional files. Using FIG. 4 as an example, if file 412 is subject to a reputation evaluation, identification module 104 may identify bad files 414(1)-(n) and 416(1)-(n) as relevant to an evaluation of file 412, as these files were created at the same time as and within the same file paths as instances of file 412. Generation module 106 may accordingly aggregate the reputations of bad files 414(1)-(n) and 416(1)-(n). In this example, generation module 106 may generate a reputation rating for file 412 based at least in part on the fact that numerous bad files were created at the same time as and within the same file paths as instances of file 412.

In another example, this aggregation may include the percentage of trusted files within the additional files and/or the percentage of untrusted files within the additional files. Referring back to the example illustrated in FIG. 4, generation module 106 may determine that 100 percent of the additional files (i.e., bad files 414(1)-(n) and 416(1)-(n)) are untrusted. Generation module 106 may accordingly generate the reputation rating based at least in part on the fact that 100 percent of the additional files created at the same time and within the same file paths as instances of file 412 on other computing systems are untrusted. For example, generation module 106 may generate a local score for a file (based on the presence or absence of other good or bad files within the same path) from a single computing device. Generation module 106 may also aggregate such local scores across multiple computing devices that have reported the file, by, for example, computing the average, median, minimum, and/or maximum of the local scores to generate a global reputation score for the file.

In an additional example, this aggregation may include the percentage of trusted files within the additional files within each client submission and/or the percentage of untrusted files within the additional files within each client submission. Referring back to the example illustrated in FIG. 4, generation module 106 may determine that 100 percent of the additional files within client submission 410(a) (i.e., bad files 414(1)-(n)) are untrusted. Generation module 106 may also determine that 100 percent of the additional files within client submission 410(b) (i.e., bad files 416(1)-(n)) are untrusted. Generation module 106 may accordingly generate the reputation rating based at least in part on the fact that 100 percent of the additional files within client submission 410(a) are untrusted and that 100 percent of the additional files within client submission 410(b) are untrusted.

Generation module 106 may use a variety of additional formulas and methods for aggregating the reputations of the additional files created at the same time and within the same file paths as instances of the file. For example, generation module 106 may subtract the number of untrusted files from the number of trusted files among the additional files, calculate the average reputation score of the additional files, determine the smallest number of untrusted files created at the same time and within the same file path as an instance of the file, perform a statistical analysis of the reputations of all files associated by creation time and path, etc.

For example, generation module 106 may compute two features for each unique file (as identified by a hash of the file) using data from all submissions from all clients that encounter the file; namely, (1) a good-path count, representing the average number of known-good files that were submitted during the same client submission and found in the same path as the file, and (2) a bad-path count, representing the average number of known-bad files that were submitted during the same client submission and found in the same path as the file. In this example, each client submission may include multiple file reports. For each file report, if the file is known to be bad, then generation module 106 may increment a counter for the path of that file in a bad-path map (e.g., "badpathmap [path]++"). Likewise, if the file is known to be good, then generation module 106 may increment a counter for the path of that file in a good-path map (e.g., "goodpathmap [path]++"). Generation module 106 may thereby calculate the number of good and bad files for each path in the client submission.

Generation module 106 may then, for each unique file in the client submission, look up the file path of the file and add the count in the bad-path map of the file path to the file's cumulative bad-path score. Likewise, generation module 106 may add the count in the good-path map of the file path to the file's cumulative good-path score. In this count, generation module 106 may exclude the file itself (e.g., if three files known to be bad were created in a single path, each file would have a bad-path score of two) so that no file may taint its own reputation.

After calculating cumulative bad-path and good-path scores for a file ("BPM_score" and "GPM_scrore," respectively), generation module 106 may divide each score by the number of distinct client submissions (or clients) that contributed to the counts. For example, generation module 106 may use the formula BPM_AGGREGATE(FileX)=sum over all client submissions that had FileX of BPM_score[client]/the number of users that had the file to calculate the average bad associated files result, and likewise the formula GPM_AGGREGATE (FileX)=sum over all client submissions that had FileX of GPM_score [client]/the number of users that had the file to calculate the average good associated files result.

In some examples, generation module 106 may combine the reputation rating with other reputation ratings relating to the file. For example, the reputation rating and the other reputation ratings relating to the file may be fed into a classifier, such as a decision tree or neural network, in order to compute a more accurate final reputation score.

In some examples, the systems described herein may, upon generating the reputation rating for the file in step 308, provide this reputation rating to at least one computing system (such as computing systems 402(a)-(c) in FIG. 4). In one example, generation module 106 may simply provide the raw reputation rating generated by generation module 106. In some examples, as mentioned above, generation module 106 may provide a reputation score that is based partly on the path-based evaluation described herein and partly on other inputs (such as a source location of the file, etc.). Additionally or alternatively, generation module 106 may provide the reputation rating in the form of an alert, a security update, a remote command to act on the file, and/or an approval of the file. In either example, the computing system may then use this reputation rating in evaluating the trustworthiness of the file in question, as will be described in greater detail below in connection with FIG. 5. Upon completion of step 308, exemplary method 300 in FIG. 3 may terminate.

Figure 5:
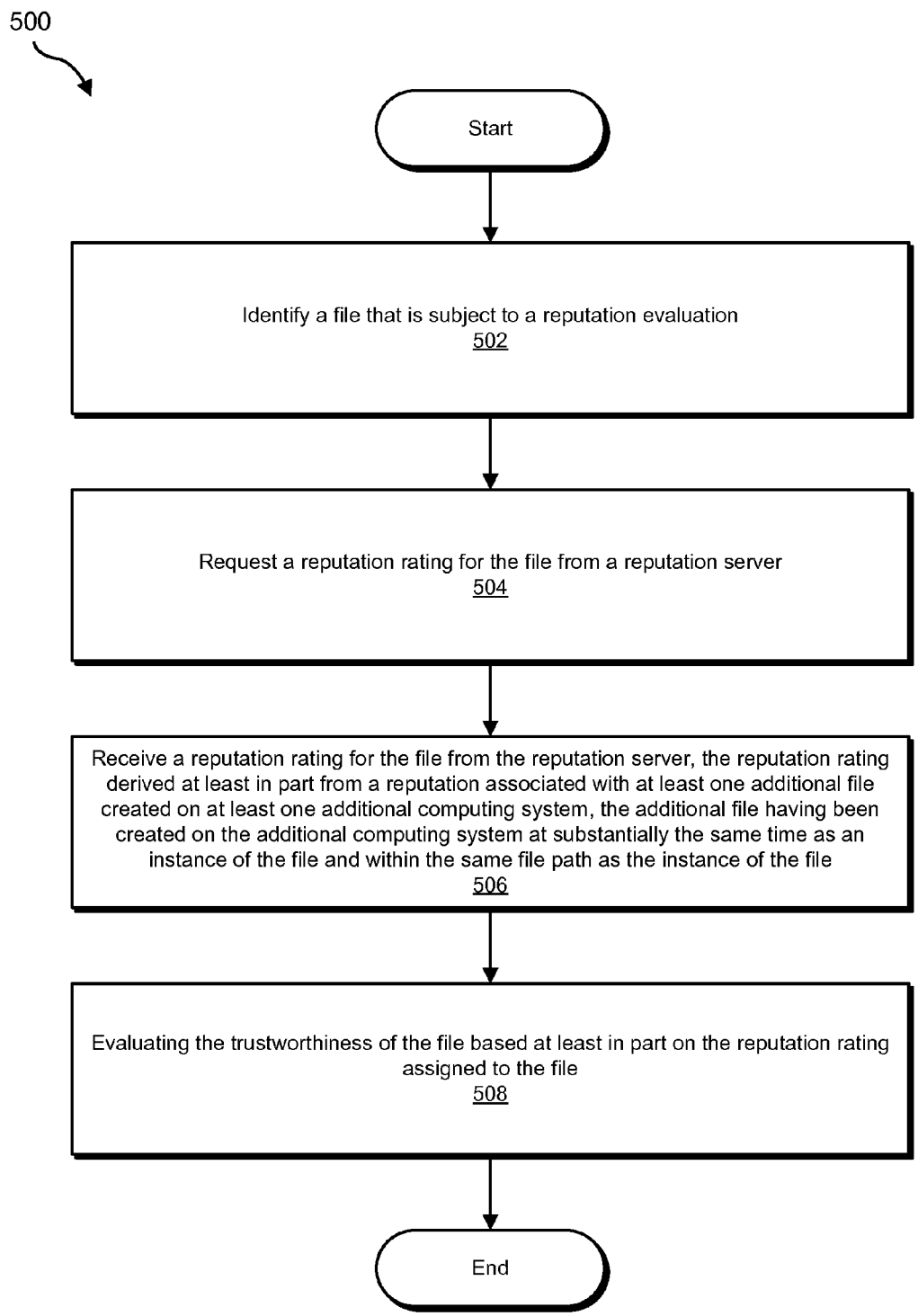
FIG. 5 is a flow diagram of an exemplary method for identifying potential malware.

As detailed above, a client device may evaluate the trustworthiness of a file based at least in part on a reputation rating assigned to the file by the process outlined in exemplary method 300 in FIG. 3. FIG. 5 is a flow diagram of an exemplary client-side, computer-implemented method 500 for evaluating the trustworthiness of a file based on such a rating. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, and/or system 400 in FIG. 4.

As illustrated in FIG. 5, at step 502 one or more of the systems described herein may identify a file that is subject to a reputation evaluation. For example, security module 108 in FIG. 1 may, as part of computing system 202(n) in FIG. 2, identify a file recently created on or encountered by computing system 202(n).

The systems described herein may identify the file in any suitable manner. For example, the systems described herein may identify the file when the file is created or otherwise encountered. Additionally or alternatively, the systems described herein may identify the file as subject to a reputation evaluation because the reputation of the file is unknown.

At step 504, one or more of the systems described herein may request a reputation rating for the file in question from a reputation server. For example, security module 108 in FIG. 1 may, as part of computing system 202(n) in FIG. 2, request a reputation rating for the file identified in step 502 from server 206.

The systems described herein may request the reputation rating in any suitable manner. In one example, the systems described herein may transmit a hash of the file in question to a reputation server. Additionally or alternatively, the systems described herein may implicitly request a reputation rating for the file in question by transmitting a client submission that contains information on newly created files to the reputation server.

At step 506, one or more of the systems described herein may receive a reputation rating for the file in question from the reputation server. For example, security module 108 in FIG. 1 may, as part of computing system 202(n) in FIG. 2, receive a reputation rating from server 206 for the file identified in step 502. As detailed above in connection with FIG. 3, this reputation rating may be derived at least in part from a reputation associated with at least one additional file created on at least one additional computing system at the same time as an instance of the file and within the same file path as the instance of the file.

The systems described herein may receive the reputation rating for the file in any suitable form. In one example, the systems described herein may simply receive a reputation score from the reputation server. Additionally or alternatively, the systems described herein may receive a reputation classification (e.g., "trusted," "untrusted," or "unknown") from the reputation server. In some examples, the systems described herein may receive an implicit reputation rating from the reputation server in the form of a remediation suggestion or command for the file.

At step 508, one or more of the systems described herein may evaluate the trustworthiness of the file in question based at least in part on the reputation rating assigned to the file. For example, security module 108 in FIG. 1 may, as part of computing system 202(n) in FIG. 2, evaluate the trustworthiness of the file identified in step 502 based at least in part on the reputation rating received from server 206 in step 506. As detailed above, in some examples security module 108 may combine this reputation rating with other reputation data and/or heuristical information relating to the trustworthiness of the file to determine the trustworthiness of the file.

In some examples, the systems described herein may determine, based at least in part on the reputation rating received in step 508, that the file in question represents a potential security risk. In these examples, security module 108 may perform a security operation on the file. Examples of security operations that security module 108 may perform on the file include, without limitation, quarantining the file, removing the file, preventing the file from executing, flagging the file for further evaluation, or any other operation that may be used to analyze or reduce the potential security risk posed by the file. Upon completion of step 508, exemplary method 500 in FIG. 5 may terminate.

As explained above, by imputing the reputation information of one or more files created at the same time and within the same file path as instances of a file to evaluate, the systems and methods described herein may improve the quality of reputation assessments, thereby improving malware detection rates relative to false positives.

Figure 6:
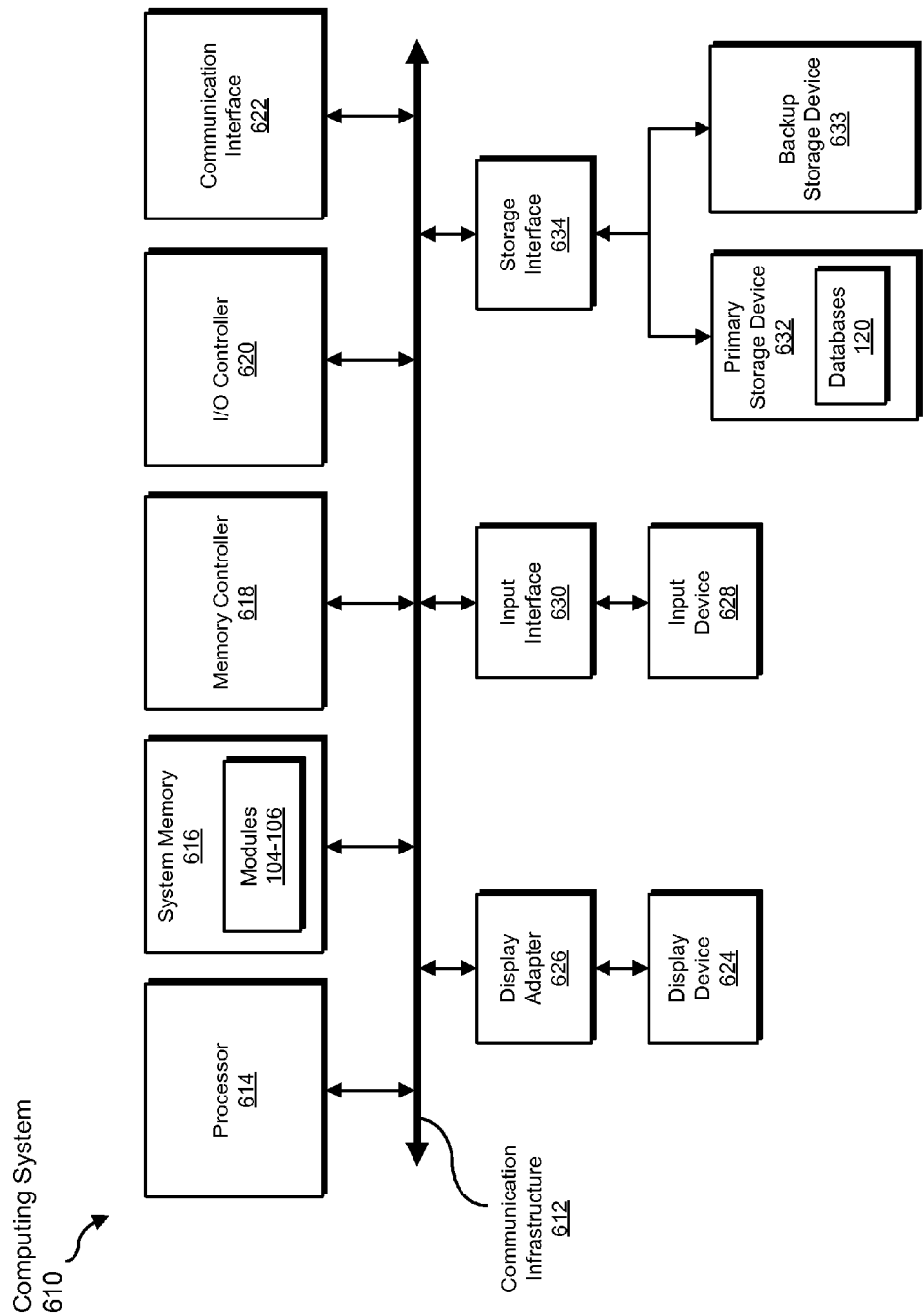
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, generating, performing, requesting, and/or receiving steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, generating, performing, requesting, and/or receiving.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, generating, performing, requesting, and/or receiving steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, generating, performing, requesting, and/or receiving steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, generating, performing, requesting, and/or receiving steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, generating, performing, requesting, and/or receiving steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
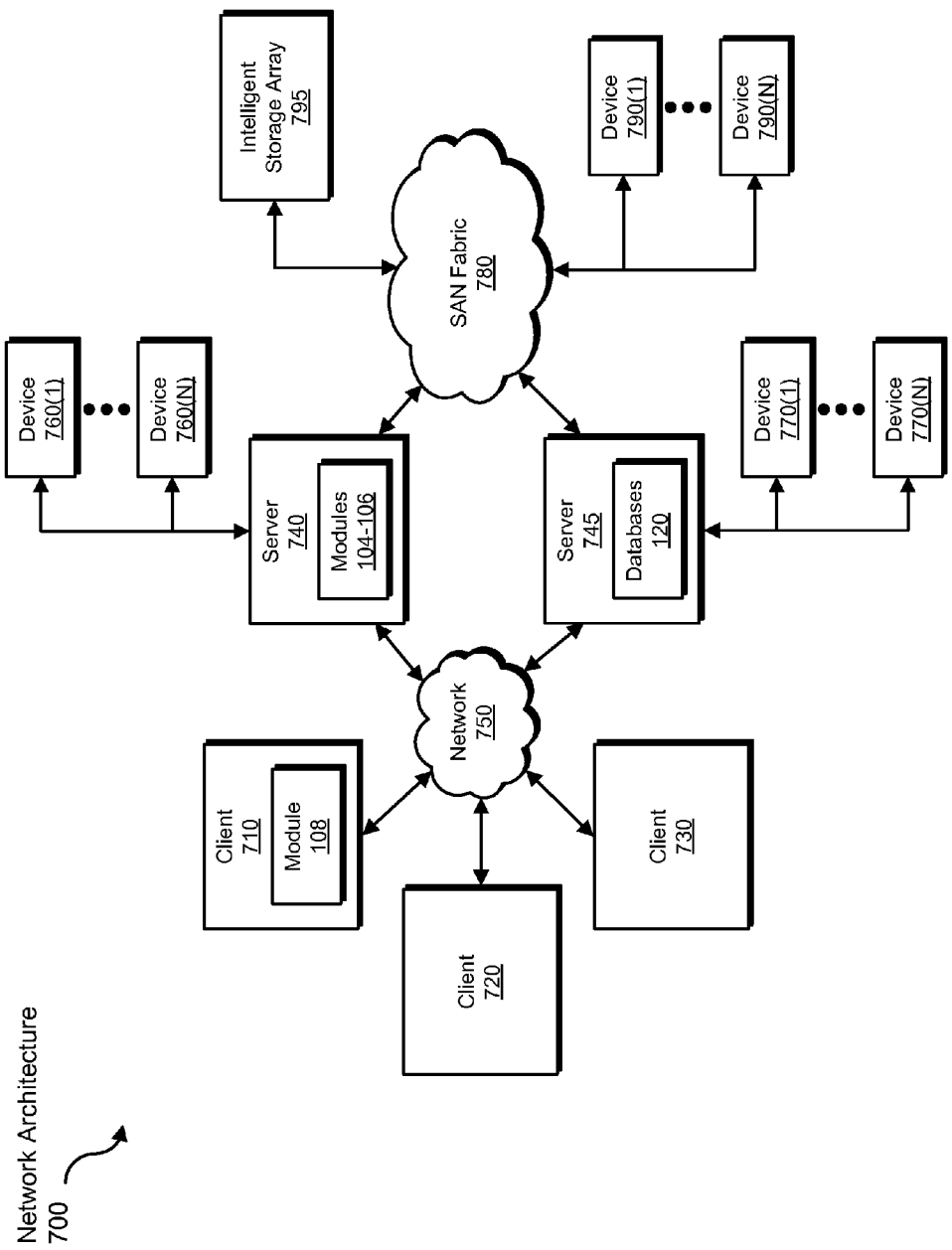
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, generating, performing, requesting, and/or receiving steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for identifying potential malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for efficiently identifying potential malware. As an additional example, one or more of the modules described herein may transform the reputations of a plurality of files into a reputation score for a related file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying potential malware, at least a portion of the method being performed by a server-side computing device comprising at least one processor, the method comprising:
    identifying a file that is subject to a reputation evaluation;
    identifying a plurality of client submissions received from a plurality of computing systems within a user community, wherein each client submission within the plurality of client submissions identifies:
        an instance of the file created on a computing system within the user community that is associated with the client submission;
        at least one additional file created on the computing system at the same time as the instance of the file and within the same file path as the instance of the file;
    identifying, for each client submission within the plurality of client submissions, a reputation associated with the additional file;
    generating, for each client submission within the plurality of client submissions, a local reputation score for the file based at least in part on the time and file path of the file and the reputation of the additional file;
    generating a reputation rating for the file by aggregating the local reputation scores for the plurality of client submissions.

2. The computer-implemented method of claim 1, wherein identifying the reputation associated with the additional file comprises obtaining, by querying a reputation database using a hash of the additional file, the reputation of the additional file from the reputation database.

3. The computer-implemented method of claim 1, wherein identifying the file that is subject to the reputation evaluation comprises determining that the file's reputation is unknown.

4. The computer-implemented method of claim 1, wherein:
    the additional file comprises a plurality of additional files;
    aggregating the local reputation scores for the plurality of client submissions comprises aggregating reputations associated with the plurality of additional files.

5. The computer-implemented method of claim 4, wherein the aggregation of reputations associated with the plurality of additional files is based at least in part on at least one of:
    the number of trusted files within the plurality of additional files;
    the number of untrusted files within the plurality of additional files.

6. The computer-implemented method of claim 4, wherein the aggregation of reputations associated with the plurality of additional files is based at least in part on at least one of:
    the percentage of trusted files within the plurality of additional files;
    the percentage of untrusted files within the plurality of additional files.

7. The computer-implemented method of claim 4, wherein the aggregation of reputations associated with the plurality of additional files is based at least in part on at least one of:
    the percentage of trusted files within the plurality of additional files within each client submission;
    the percentage of untrusted files within the plurality of additional files within each client submission.

8. The computer-implemented method of claim 1, wherein the file path comprises a truncated file path.

9. The computer-implemented method of claim 1, further comprising providing the reputation rating to at least one additional computing system.

10. The computer-implemented method of claim 1, wherein at least one client submission within the plurality of client submissions comprises identification information that uniquely identifies files created on the computing system subsequent to a previous client submission from the computing system.

11. A computer-implemented method for identifying potential malware, at least a portion of the method being performed by a client-side computing device comprising at least one processor, the method comprising:
    identifying a file that is subject to a reputation evaluation;
    requesting a reputation rating for the file from a reputation server;
    receiving the reputation rating for the file from the reputation server, the reputation rating derived at least in part by:
        identifying a plurality of client submissions received from a plurality of computing systems within a user community, wherein each client submission within the plurality of client submissions identifies an instance of the file created on a computing system within the user community that is associated with the client submission and at least one additional file created on the computing system at the same time as the instance of the file and within the same file path as the instance of the file;
        identifying, for each client submission within the plurality of client submissions, a reputation associated with the additional file;
        generating, for each client submission within the plurality of client submissions, a local reputation score for the file based at least in part on the time and file path of the file and the reputation of the additional file;
        aggregating the local reputation scores for the plurality of client submissions;
    evaluating the trustworthiness of the file based at least in part on the reputation rating assigned to the file.

12. The computer-implemented method of claim 11, further comprising performing a security action on the file based at least in part on the reputation rating.

13. A system for identifying potential malware, the system comprising:
    an identification module that:
        identifies a file that is subject to a reputation evaluation;
        identifies a plurality of client submissions received from a plurality of computing systems within a user community, wherein each client submission within the plurality of client submissions identifies:

an instance of the file created on a computing system within the user community that is associated with the client submission;

at least one additional file created on the computing system at the same time as the instance of the file and within the same file path as the instance of the file;

identifies, for each client submission within the plurality of client submissions, a reputation associated with the additional file;

a generation module that:

generates, for each client submission within the plurality of client submissions, a local reputation score for the file based at least in part on the time and file path of the file and the reputation of the additional file;

generates a reputation rating for the file by aggregating the local reputation scores for the plurality of client submissions;

at least one hardware processor configured to execute the identification module and the generation module.

14. The system of claim 13, wherein the identification module identifies that the file is subject to the reputation evaluation by determining that the file's reputation is unknown.

15. The system of claim 13, wherein:

the additional file comprises a plurality of additional files;

the generation module aggregates the local reputation scores for the plurality of client submissions by aggregating reputations associated with the plurality of additional files.

16. The system of claim 15, wherein the aggregation of reputations associated with the plurality of additional files is based at least in part on at least one of:

the number of trusted files within the plurality of additional files;

the number of untrusted files within the plurality of additional files.

17. The system of claim 15, wherein the aggregation of reputations associated with the plurality of additional files is based at least in part on at least one of:

the percentage of trusted files within the plurality of additional files;

the percentage of untrusted files within the plurality of additional files.

18. The system of claim 15, wherein the aggregation of reputations associated with the plurality of additional files is based at least in part on at least one of:

the percentage of trusted files within the plurality of additional files within each client submission;

the percentage of untrusted files within the plurality of additional files within each client submission.

19. The system of claim 13, wherein the file path comprises a truncated file path.

20. The system of claim 13, further comprising a security module that performs a security action on the file based at least in part on the reputation rating.

\* \* \* \* \*